E. RAWSON.
CURING MEATS.
APPLICATION FILED DEC. 29, 1910.
1,033,269. Patented July 23, 1912.
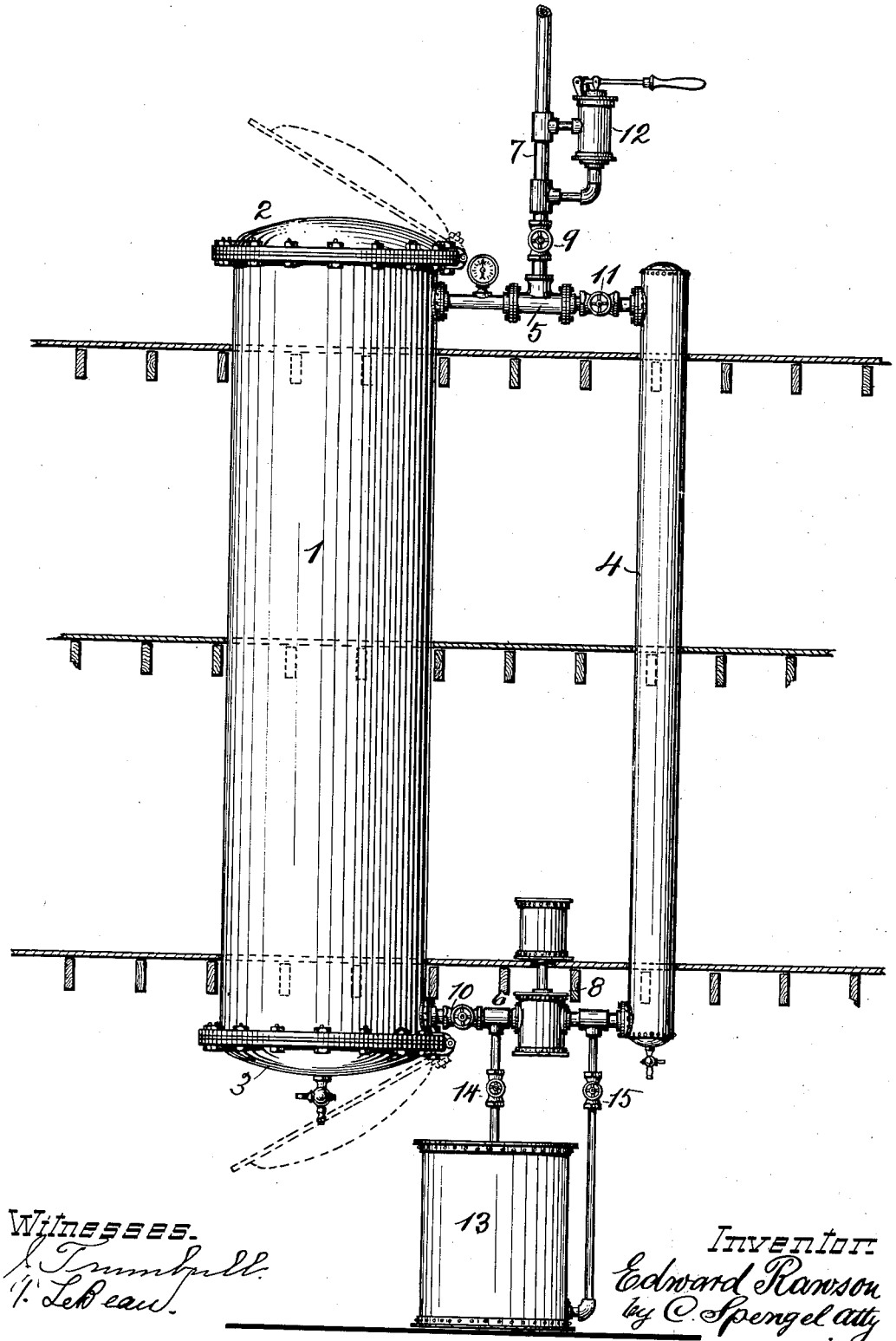

UNITED STATES PATENT OFFICE.

EDWARD RAWSON, OF CINCINNATI, OHIO.

CURING MEATS.

1,033,269.  Specification of Letters Patent.  Patented July 23, 1912.

Application filed December 29, 1910. Serial No. 599,876.

*To all whom it may concern:*

Be it known that I, EDWARD RAWSON, a citizen of the United States, and residing at Cincinnati, Hamilton county, State of Ohio, have invented certain new and useful Improvements in the Curing of Meats; and I do declare the following to be a clear, full, and exact description thereof, attention being called to the drawing which accompanies this application and forms a part thereof.

This invention relates to improvements in the curing of meats, particularly pork products where the curing involves the use of a preserving or pickling liquor.

Under present procedures and in the case of hams and joints for instance, it requires usually from three to four months to effect curing by saturation with a pickling liquor sufficient to permit smoking.

The main object of my invention is to shorten this procedure so that it may be accomplished in about one third of the time and also with improved results.

Instead of relying merely upon absorption to charge the meat with the pickling liquor, I use hydraulic pressure to force the same into the cells of the meat and I also manipulate the liquor in a manner to add a mechanically induced osmotic action whereby the natural juices of the meat, instead of being drawn out as for instance in the case of curing with dry salt, or by means of processes involving the use of vacuum, are retained and caused to be charged with the savor of the pickling liquor, which in this manner is caused to become a part of these juices and penetrates all parts of the meat.

The invention consists of the method of treating meat products in the manner outlined, all as hereinafter described and claimed and as illustrated in the accompanying drawing which shows in diagrammatic view an apparatus used in connection with my invention.

In this latter, 1, indicates a receptacle intended to receive the meat to be treated, hams for instance and the curing liquor used in connection therewith.

The size of the receptacle depends upon capacity of the establishment and since economy results from handling large lots at once, it should be arranged accordingly. A size permitting the handling of carload lots, about 30,000 pounds, is advisable. Its strength should be sufficient to stand the pressures hereafter mentioned, for which purpose a cylindrical tank-form is most desirable. Openings to permit charging and removal of the contents are provided and preferably obtained by leaving the ends of the tank open. By placing the same in an upright position, meat may be charged into it from an upper floor, and removal may be had on a lower floor. Caps are provided, one designated by 2, for the inlet-end, and another one 3, for the outlet-end and means are added whereby these caps may be securely closed.

4 designates a stand-pipe which communicates with the tank near both ends thereof by branches 5 and 6.

7 designates a fill-pipe through which the curing liquor is supplied to the apparatus.

8 designates a circulating pump placed in a suitable position permitting it to be used for the purpose of moving the liquor within the apparatus, it being inserted for the purpose, or cut-in into the lower branch 6.

Operations are started by filling the tank with meat and liquor, the former being placed carefully so as to prevent it from becoming bruised. The meat before placed into the tank must be thoroughly chilled to the bone and hams and joints are "pumped" in the usual manner, that is pickle is injected with the needle into the shanks and butts of the hams, also into the fat of the same near the veil or diaphragm between fat and lean, also into the knuckle-joints, the object being to reach and charge the deeper situated cells and particularly those around the bone quicker than would otherwise be possible and for other reasons to be presently explained. Sufficient liquor is supplied so as to fill the tank which is closed below, any surplus passing over into stand-pipe 4. After this, a valve 9 is closed and with fully open communication between tank 1 and pipe 4 at both branches 5 and 6, operation of pump 8 is started, whereby the pickle is caused to freely circulate upwardly through the tank and between the meat. By means of this circulation, maintained for from five to ten hours, equal treatment of all exterior surfaces is obtained and adherence of the hams to each other and discoloration is prevented. After this, valves 10 and 11 are closed, valve 9 is opened and additional liquor is forced into the completely closed tank 1, until a pressure of approximately 100 pounds is reached, a force-pump 12 being used for the purpose. This condition is maintained for several hours, it may be during the night, after which communication with the stand-pipe is reëstablished to relieve the pressure in tank 1.

Communication with the fill-pipe having been closed by means of valve 9, circulating pump 8 is started again and circulation resumed. This is followed again by a period of maintenance under pressure, obtained by means of the force-pump, the proper valves having been manipulated, after which this treatment proceeds for about ten days, consisting of a series of periods during which the liquor is maintained under pressure, which periods alternate with periods during which the pressure is taken off and the liquor is caused to circulate freely. The length of these alternate periods, is by preference three hours, more or less, except in cases where the establishment is not operated at night, in which case operations between two days are filled out during the intervening night by one extended period of maintenance under pressure. The pressure during each succeeding pressure period may be gradually increased. After about ten days, the periods of circulation are discontinued and the charged tank is again put under pressure by adding the liquor which may be increased to 300 pounds, which condition is maintained for about five more days, after which the entire process is complete. These alternating changes in the pressure of the liquor, cause the cells of the meat to alternately expand and contract, thus favoring a thorough saturation of it with the pickling liquor. The previously mentioned injection of brine which precedes the application of pressure prevents meat-juices from being driven into the deeper lying cells ahead of the pressure-forced brine and also accumulation of joint-water around the bones. The liquor need only be of moderate strength and a mild salt and sugar pickle, of not over 16 to 18 degrees salometer test produces the desired results.

The entire process being carried on in a closed conduit, no deterioration of the liquor results by exposure to air, or from contact with the interior of the tank which, by coating or otherwise, is arranged accordingly and the same liquor may be re-used for some time, any decrease being replenished by fresh liquor.

The meat is removed through the lower end, cap 3 being gradually opened, the liquor having first been drawn off into a tank 13.

In re-filling tank 1, the liquor from tank 13 may be used first, being raised by means of pump 8, but during circulation this tank is preferably cut out, valves 14 and 15 being provided for the purpose. This tank may also be used to receive surplus liquor from tank 1 whenever the pressure therein is to be reduced during the circulation periods.

The times given for the duration of the treatment depends somewhat on the size of the pieces and may be varied accordingly.

In large establishments the process may be carried on continuously, a number of tanks being arranged in batteries which may be operated with one pumping outfit.

I am aware that curing methods have been used in which the meat is subjected to the action of a vacuum, the ostensible object being to free it of objectionable gases. I find however that the use of such a vacuum has the detrimental effect of also drawing the savory meat-juices from the cells of the meat whereby its wholesome taste and flavor is seriously impaired. For these reasons I do not employ a vacuum, but rely on the previous chilling of the meat which, by expelling the animal heat, stops also generation of any objectionable gases. The necessary dilation and opening of the meat-cells and pores, to render them receptive to brine, is obtained by the purely mechanical pumping action of the liquor which alternately opens and closes these cells and brings them in intimate contact with the brine without withdrawing the essential meat-juices.

Having described my invention, I claim as new:

1. The method of curing meat-products which comprises injection of curing liquor into the same, of submerging it thereafter in a curing liquor, of causing said liquor to circulate at intermittent periods and of putting it under forced pressure between these periods of circulation.

2. The method of curing meat-products which comprises submergence of the meat in a curing liquor, of causing said liquor to circulate at intermittent periods, of putting it under pressure between these periods of circulation by forced addition of liquor and of concluding the process by a more extended period of pressure.

3. The method of curing meat-products which comprises submergence of the meat in curing liquor, of causing said liquor to circulate at intermittent periods, of putting it under pressure between these periods of circulation by forced addition of liquor and of concluding the process by an extended period of pressure which is higher than that previously applied.

4. The method of curing meat-products which comprises submergence of the meat in curing liquor and of maintaining this liquor periodically under pressure by forced addition of liquor, the pressure being gradually increased during succeeding periods.

5. The method of curing meat-products which comprises submergence of the meat in a curing liquor, of raising the pressure of this liquor at intermittent periods by forced addition of liquor and of maintaining it so, the pressure being reduced to normal between each of these periods and gradually increased during each succeeding period.

6. The method of curing meat-products which comprises submergence of the meat in a curing liquor and of raising and maintaining the pressure of this liquor at intermittent periods by forced addition of liquor, the liquor between these periods being caused to circulate after having been reduced to normal pressure.

In testimony whereof, I hereunto affix my signature in the presence of two witnesses.

EDWARD RAWSON.

Witnesses:
   C. SPENGEL,
   T. LeBEAU.